(12) United States Patent
Smeljanskij et al.

(10) Patent No.: US 9,920,810 B2
(45) Date of Patent: Mar. 20, 2018

(54) DAMPING VALVE FOR A SHOCK ABSORBER

(71) Applicant: THYSSENKRUPP BILSTEIN GMBH, Ennepetal (DE)

(72) Inventors: Dmitrij Smeljanskij, Leverkusen (DE); Klaus Schmidt, Odenthal (DE); Ole Götz, Braunschweig (DE); Wolfgang Hamers, Jülich (DE); Freddy Woenarta, Braunschweig (DE)

(73) Assignee: THYSSENKRUPP BILSTEIN GMBH, Ennepetal (DE)

( * ) Notice: Subject to any disclaimer, the term of this patent is extended or adjusted under 35 U.S.C. 154(b) by 0 days.

(21) Appl. No.: 14/433,844

(22) PCT Filed: Oct. 4, 2013

(86) PCT No.: PCT/EP2013/070719
§ 371 (c)(1),
(2) Date: Apr. 6, 2015

(87) PCT Pub. No.: WO2014/053639
PCT Pub. Date: Apr. 10, 2014

(65) Prior Publication Data
US 2015/0316118 A1    Nov. 5, 2015

(30) Foreign Application Priority Data
Oct. 4, 2012   (DE) .................. 10 2012 109 437

(51) Int. Cl.
*F16F 9/348*    (2006.01)
*F16K 15/14*    (2006.01)
(Continued)

(52) U.S. Cl.
CPC .............. *F16F 9/3484* (2013.01); *F16F 9/19* (2013.01); *F16F 9/3485* (2013.01);
(Continued)

(58) Field of Classification Search
CPC ........ F16F 9/348; F16F 9/3481; F16F 9/3482; F16F 9/512; F16F 9/3485; F16F 9/5126;
(Continued)

(56) References Cited

U.S. PATENT DOCUMENTS

| | | | |
|---|---|---|---|
| 3,180,453 A * | 4/1965 | Murata | F16F 9/34 137/514 |
| 3,199,636 A * | 8/1965 | Bourcier De Carbon | F16F 9/3214 137/493 |

(Continued)

FOREIGN PATENT DOCUMENTS

| | | |
|---|---|---|
| CN | 101809312 A | 8/2010 |
| CN | 102648361 A | 8/2012 |

(Continued)

OTHER PUBLICATIONS

German Language International Search Report for International patent application No. PCT/EP2013/070719; dated Jan. 31, 2014.

(Continued)

*Primary Examiner* — Bradley King
*Assistant Examiner* — Stephen Bowes
(74) *Attorney, Agent, or Firm* — Thyssenkrupp North America, Inc.

(57) ABSTRACT

The present invention relates to a damping valve for a shock absorber, comprising a base body with a first support body and with a second support body and comprising one or more valve spring discs which separate a first damping fluid space from a second damping fluid space, wherein the valve spring discs are supported against the first support body via an inner edge support, and against the second support body via an outer edge support, and which control a passage of damping fluid in both directions by virtue of the fact that the valve spring discs lift-off either from the inner edge support or from the outer edge support, by elastic deflection. According (Continued)

to the invention, a stroke movable control body is provided which is prestressed against the valve spring discs, so that the control behaviour of the valve spring discs can be adjusted via the edge supports by the prestress of the control body.

14 Claims, 4 Drawing Sheets

(51) Int. Cl.
*F16F 9/19* (2006.01)
*F16F 9/512* (2006.01)

(52) U.S. Cl.
CPC .......... *F16F 9/3488* (2013.01); *F16F 9/5126* (2013.01); *F16K 15/144* (2013.01)

(58) Field of Classification Search
CPC ........ F16F 9/516; F16F 9/3214; F16F 9/3488; F16F 9/3487; F16F 9/3484
See application file for complete search history.

(56) References Cited

U.S. PATENT DOCUMENTS

| | | | |
|---|---|---|---|
| 3,312,312 A | 4/1967 | Bourcier De Carbon | |
| 4,083,437 A * | 4/1978 | Leppich | F16F 9/3482 |
| | | | 137/493.8 |
| 4,096,928 A * | 6/1978 | Krafzig | B60R 19/32 |
| | | | 137/493.8 |
| 4,460,074 A * | 7/1984 | Muller | F16F 9/341 |
| | | | 188/282.6 |
| 4,972,929 A | 11/1990 | Ivers et al. | |
| 5,078,241 A | 1/1992 | Ackermann | |
| 5,769,193 A * | 6/1998 | Beck | F16F 9/3482 |
| | | | 188/319.1 |
| 5,857,665 A | 1/1999 | Beck | |
| 6,612,321 B1 | 9/2003 | Ertle | |
| 8,083,039 B2 | 12/2011 | Vanbrabant | |
| 8,794,407 B2 | 8/2014 | Vanbrabant et al. | |

FOREIGN PATENT DOCUMENTS

| | | |
|---|---|---|
| DE | 966497 B | 8/1957 |
| DE | 1265501 B | 4/1968 |
| DE | 3914297 C | 5/1991 |
| DE | 4008324 C | 6/1991 |
| DE | 19547535 A | 6/1997 |
| DE | 19757234 C | 3/1999 |
| DE | 19842840 A | 3/2000 |
| GB | 1351916 A | 5/1974 |

OTHER PUBLICATIONS

English translation of International Search Report for International patent application No. PCT/EP2013/070719; dated Jan. 31, 2014.
German Language Written Opinion for International patent application No. PCT/EP2013/070719; dated Jan. 31, 2014.
English translation of Written Opinion for International patent application No. PCT/EP2013/070719; dated Jan. 31, 2014.
English abstract of DE19757234C.
English machine translation of DE966497B.
English abstract of DE4008324C.

* cited by examiner

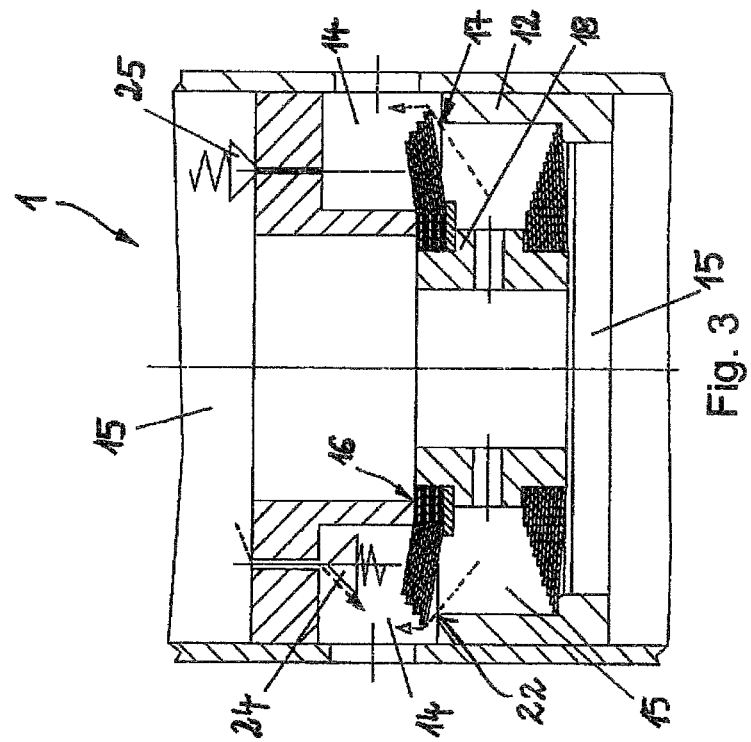
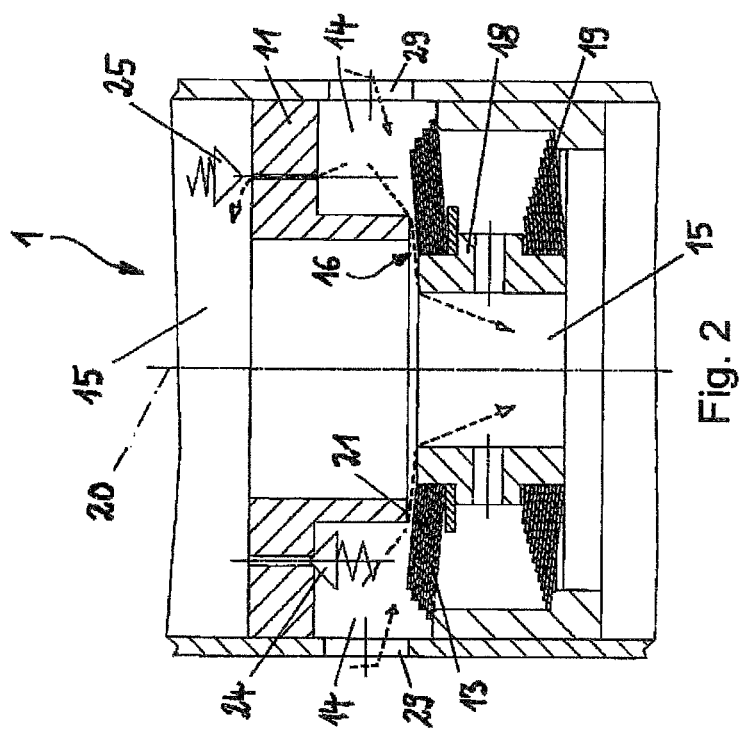

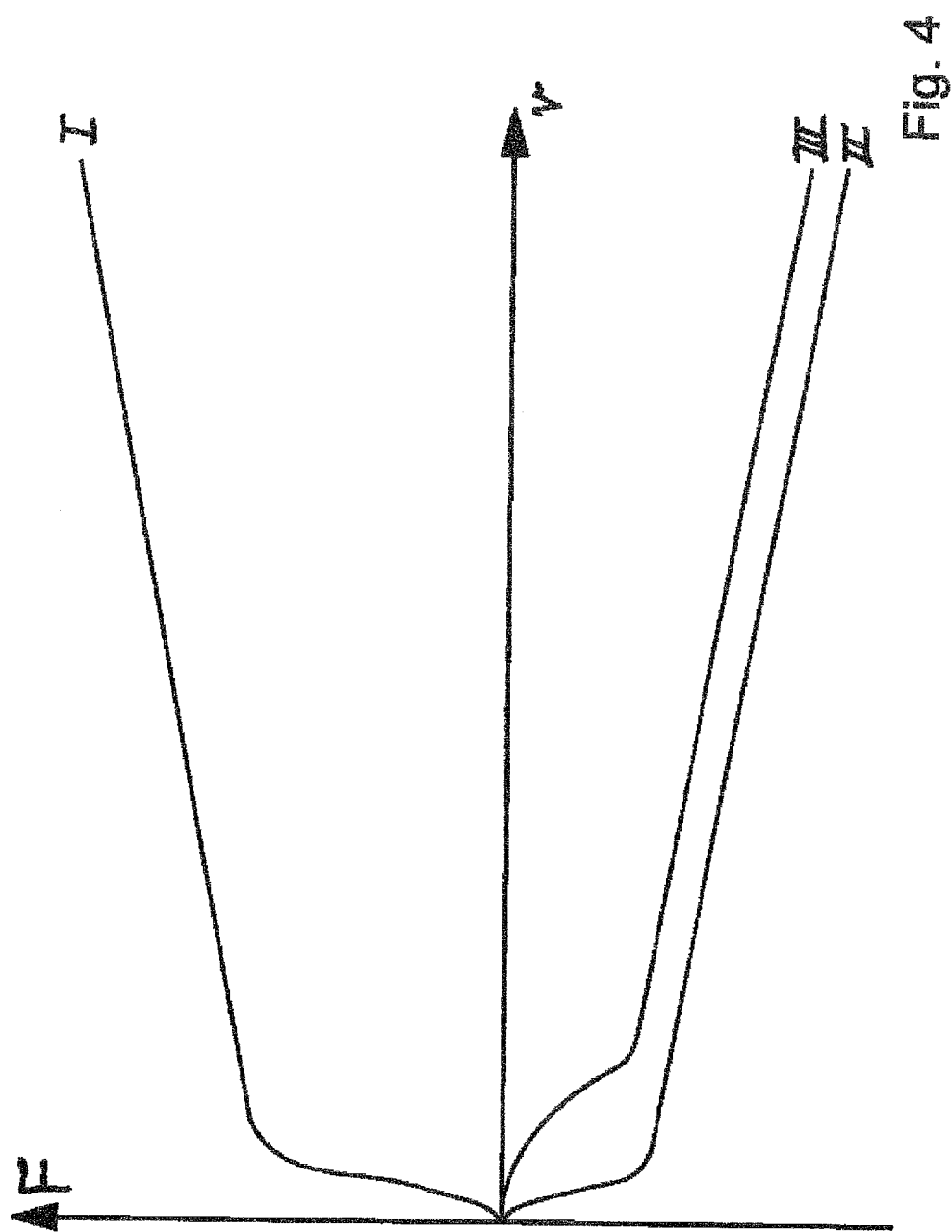

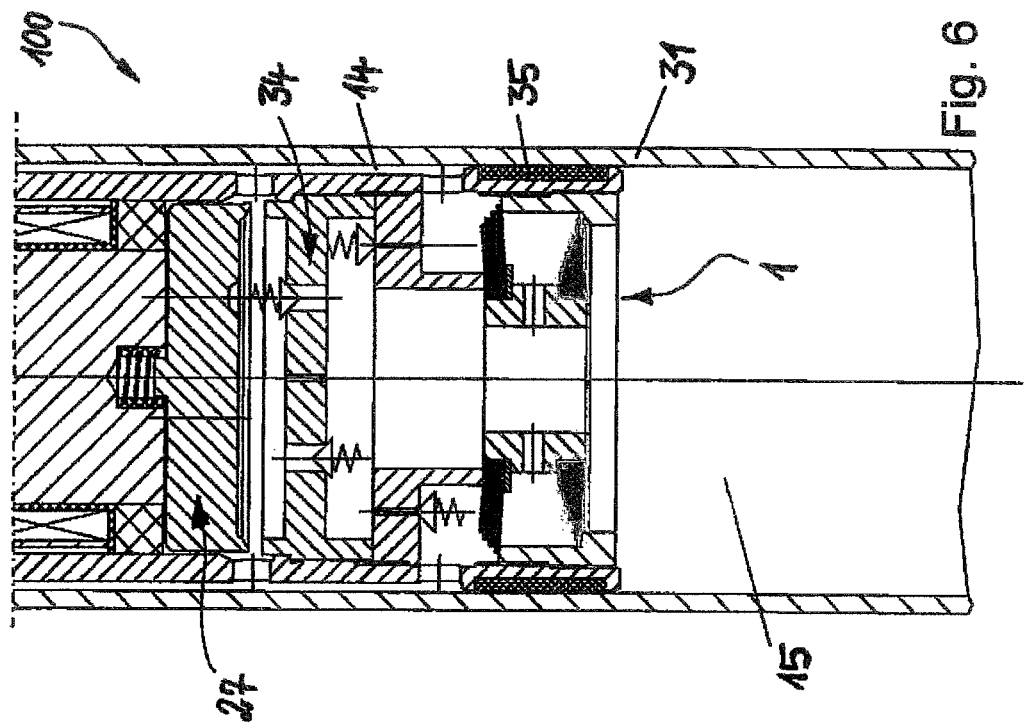
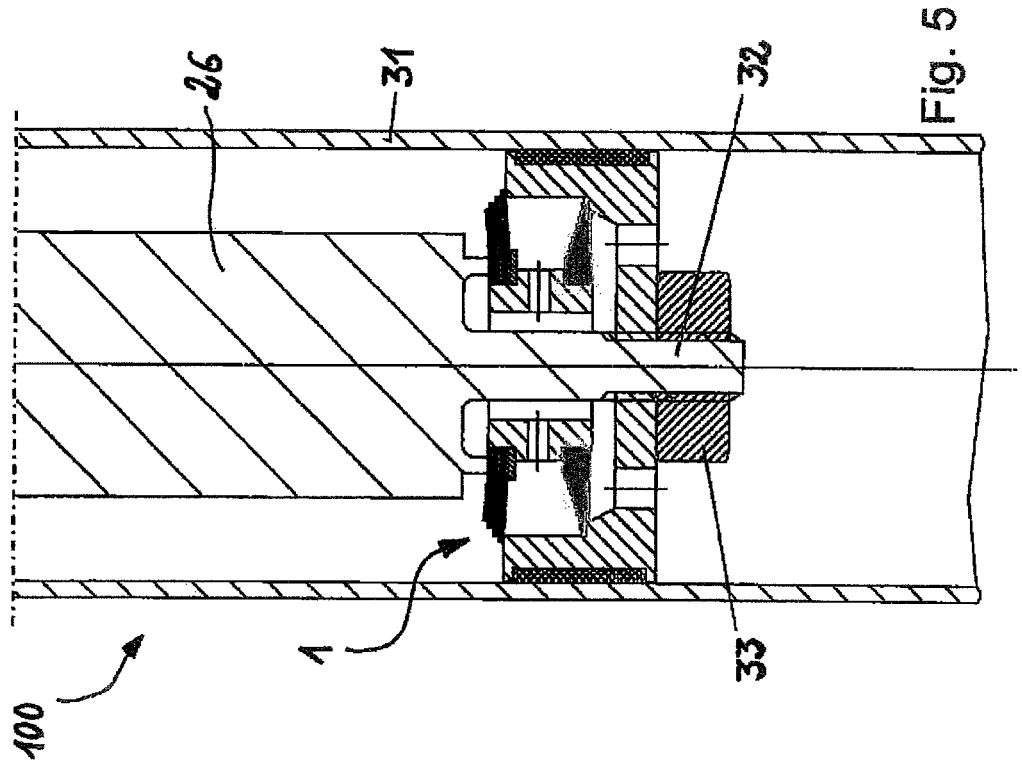

DAMPING VALVE FOR A SHOCK ABSORBER

CROSS REFERENCE TO RELATED APPLICATIONS

This application is a U.S. National Stage Entry of International Patent Application Ser. No. PCT/EP2013/070719, filed Oct. 4, 2013, which claims priority to German patent application no. DE 102012109437.3 filed Oct. 4, 2012, the entire contents of both of which are incorporated herein by reference.

FIELD

The present invention relates to a damping valve for a shock absorber.

BACKGROUND

DE 1 265 501 A presents a damping valve for a shock absorber with a base body which is attached at one end to a piston rod of the shock absorber. The base body of the damping valve separates a first damping fluid space from a second damping fluid space, whereby the base body has passages via which the damping fluid spaces are fluidically connected to one another. Valve spring discs, which close the passages within the base body when the pressure difference of the damping fluid between the damping fluid spaces remains below a limiting value, are held on the base body. If the base body of the damping valve is moved via the piston rod, a pressure difference occurs between the damping fluid spaces, which pressure difference can exceed the limiting value, and the valve spring discs either lift-off from their inner edge support or from their outer edge support, depending on the direction of movement of the base body which can be moved to and fro in a shock absorber tube.

The valve spring discs are held centered on the base body via the inner edge support, and the behavior of the elastic deflection of the valve spring discs is determined by geometric and material properties of the valve spring discs, wherein the degree of elastic prestress of the valve spring discs on the base body also further determines the opening behavior. For example, strongly prestressed valve spring discs of more rigid design lift-off from their edge support to a lesser degree than more elastic, less prestressed valve spring discs.

In the damping arrangement shown by means of the valve spring discs, the disadvantage arises that the opening behavior of the valve spring discs is already defined by the lift-off of the employed valve spring discs from the inner edge support and from the outer edge support. Consequently, via the valve spring discs used, the force/speed behavior of the shock absorber is already determined by the valve spring discs both in the pressure stage during retraction and in the traction stage during extension. Thus there is disadvantageously not the possibility of a separate adjustment of the force/speed behavior between the traction stage and the pressure stage during operation of the shock absorber.

SUMMARY

This results in the object of the present invention of providing a damping valve for a shock absorber, which damping valve permits separate adjustability of the force/speed behaviour in the traction stage and in the pressure stage of a shock absorber when elastic deflection of valve spring discs is utilized. In one aspect of the present disclosure, a damping valve for a shock absorber comprises a base body with a first support body, a second support body, and one or more valve spring discs which separate a first damping fluid space from a second damping fluid space. The valve spring discs are supported against the first support body via an inner edge support, and against the second support body via an outer edge support. The valve spring discs control a passage of damping fluid in both directions, so that the valve spring discs lift-off either from the inner edge support or from the outer edge support, by elastic deflection.

BRIEF DESCRIPTION OF THE DRAWINGS

The present disclosure is described in detail below with reference to the attached drawing figures, wherein:

FIG. 2 is a cross-section view of the damping valve of FIG. 1, shown under extension loading, as a result of which valve spring discs lift-off from an inner edge support with an elastic deflection.

FIG. 3 is a cross-section view of the damping valve of FIG. 1, shown under compression loading, as a result of which valve spring discs lift-off from an outer edge support with elastic deflection.

FIG. 4 is a graph of the force profile plotted against the speed of a shock absorber in each of the traction stage and the pressure stage.

FIG. 5 is a partial cross-section of an embodiment of a shock absorber having a damping valve, as disclosed herein, which valve is disposed about an end of a piston rod of the shock absorber.

FIG. 6 is a partial cross-section of an embodiment of a shock absorber having a damping valve in operative communication to an electric shift valve, as disclosed herein.

DETAILED DESCRIPTION

Figure 1:
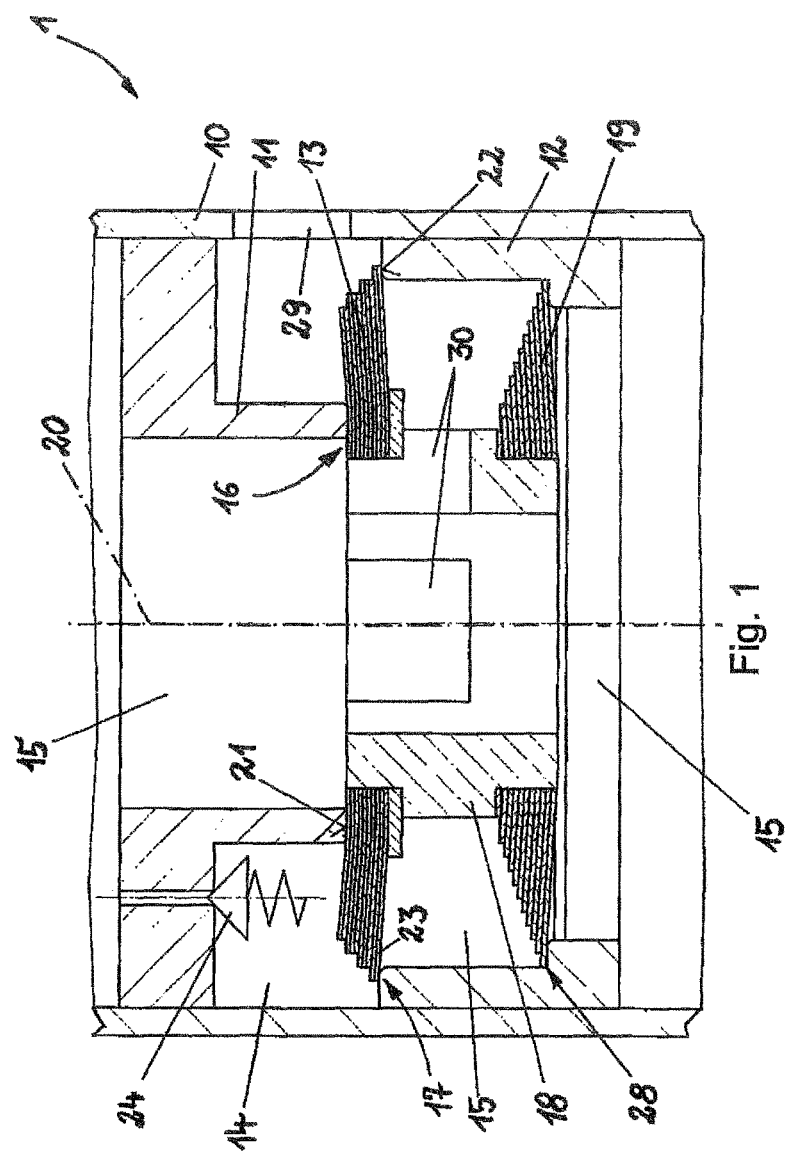
FIG. 1 is a cross-section view of an embodiment of a damping valve for a shock absorber, as disclosed herein, wherein the damping valve is illustrated in a resting state.

A damping valve for a shock absorber, as disclosed herein, comprises a base body with a first support body, a second support body, and one or more valve spring discs which separate a first damping fluid space from a second damping fluid space. The valve spring discs are supported against the first support body via an inner edge support, and against the second support body via an outer edge support. The valve spring discs control a passage of damping fluid in both directions, so that the valve spring discs lift-off either from the inner edge support or from the outer edge support, by elastic deflection. The invention includes the technical teaching that a stroke movable control body is provided which is prestressed against the valve spring discs, so that the control behaviour of the valve spring discs can be adjusted by the prestress of the control body. The control body is advantageously held stroke movable in the base body of the damping valve.

The adjustability of the opening behavior valve spring discs which can be achieved by means of the stroke movable control body relates here to at least one opening direction in which the valve spring discs lift-off from one of the edge supports. During the lift-off of the valve spring discs from the edge support, the stroke movable control body must also be moved, and as a result of the adjustable prestress of the control body the lift-off force of the valve spring discs can be changed by the edge support. Hereby, the control body is prestressed with the valve spring discs against the edge support, and when a corresponding differential pressure between the damping fluid spaces is reached, in order to lift-off the valve spring discs from the edge support it is necessary both to apply the elastic deflection to the valve spring discs themselves and to move the control body counter to its prestress. If the prestress of the control body is changed, the opening behavior of the valve spring discs in the at least one passage direction consequently also changes. As a result, a separate adjustability of the traction stage and pressure stage of the shock absorber is achieved, since the one passage direction continues to be influenced only by the elastic deflection behavior of the valve spring discs, and the other passage direction is influenced by the elastic deflection behavior of the valve spring discs and of the prestress of the control body.

According to an advantageous embodiment, the control body is held on the base body by a spring arrangement. In particular, the spring arrangement can be formed by one or more spring discs by which the control body is held stroke movable in the stroke axis and centered in the base body. Preferably, a plurality of spring discs form, in an arrangement lying one on top of the other, a spring disc packet, wherein the valve spring discs also advantageously form a spring disc packet against the edge supports in order to perform the valve function. With the spring disc packet which forms the spring arrangement for prestressing the base body, the latter can prestress the valve spring discs against one of the edge supports. The base body preferably prestresses, via the spring discs, the valve spring discs against the inner edge support which is formed on a section of the base body. Since the valve spring discs are already likewise slightly prestressed by elastic deflection as a result of an axial offset of the edge supports with respect to them, there is resulting prestress against the inner edge support as a result of the elastic prestress of the valve spring discs themselves and as a result of the valve spring discs which prestress the control body.

The valve spring discs can be particularly advantageously held centered on the control body, and as a further centering means the control body can be held centered in the base body via the spring discs. The spring discs for prestressing the control body can likewise have different diameters, and for example the largest spring disc can be centered in a centering seat in the base body. This results in a centered and guided arrangement of the control body in the base body, and the base body also extends into the central openings which are formed in the spring discs for prestressing the control body. As a result, the control body is held centered and stroke movable via the spring disc packet in the base body, and the valve spring discs are held centered on the control body in order to perform the valve function. Alternatively, the valve spring discs can also be held centered in the base body. In particular, the invention can also be embodied in such a way that a, for example, annular control body is held in the base body in a likewise prestressed manner, and the lift-off of the valve spring discs from the outer edge support is also influenced, while the valve spring discs can merely lift-off from the inner edge support counter to their own prestress. Therefore, the principle of the inner and outer edge support with and without influence of the additional prestress by the control body can also be reversed. An annular control body could, for example, also be guided stroke movable on the inner wall of the cladding tube of the base body and prestressed with a spring packet.

According to an advantageous embodiment for forming the base body, the latter can be embodied in multiple parts. The plurality of parts for forming the base body can be joined to one another, for example by means of materially joined, frictionally locking or positively locking joining methods. For example, the base body can have a cladding tube which can be held on a piston rod. Furthermore, the first and second support bodies can be arranged within the cladding tube and connected thereto. An advantage of such a base body results, in particular, from the fact that the inner edge support can be formed, for example, against a supporting edge formed on the first support body, and the outer edge support can be formed against a supporting edge on the second support body. In this context, the cladding tube, the first support body and/or the second support body can extend essentially rotationally symmetrically around the stroke axis of the damping valve. A radially circumferential interval, over which the valve spring discs extend circumferentially between the inner and the outer edge support, can be provided between the inner edge support on the first support body and the outer edge support on the second support body, wherein the valve spring discs project radially beyond the supporting edges on the support bodies, both inwards and outwards, in order to form the edge supports.

With further advantage at least one of the valve spring discs can have, in the region of an edge support, a slot, which forms a bypass for the damping fluid to flow through. The slot thereby can assume any desired geometry and serves merely to provide a flow window into the valve disc or discs, in order to provide a through-flow of the damping fluid through the valve seat even when the valve spring discs rest on the respective supporting edge. In particular, a valve spring disc can have a slot and therefore serves as a bypass disc and forms the respective valve spring disc in the valve spring package which comes to bear against the supporting edge. Of course, at least one of the supporting edges can also have at least one slot, as a result of which the same bypass effect is achieved.

Alternatively or additionally to the use of slotted valve spring discs or slotted supporting edges, there is the possibility of using non-return valves which have a bypass function and which can be arranged in the base body of the damping valve, in order to permit, in the opening state, an additional through-flow of damping fluid between the damping fluid spaces. This ensures that individually adjustable traction stage start-ups and pressure stage start-ups of the shock absorber force during the extension and retraction are made possible by means of the piston speed. In this context, it is possible to provide just one non-return valve in the base body in order either to perform a bypass function for the traction stage or for the pressure stage, or two non-return valves which act in opposite directions are arranged in the base body, in order to provide a bypass function both for the traction stage and for the pressure stage. In particular, for the traction stage start-ups and pressure stage start-ups non-return valves have a positive effect and the non-linear traction or pressure stage start-ups can be followed by a linear pressure limitation range plotted against the speed with which, for example, the shock absorber is retracted or extended.

The invention is also directed to a shock absorber having a damping valve which has a base body with a first support body and with a second support body and comprising one or more valve spring discs which separate a first damping fluid space from a second damping fluid space, wherein the valve spring discs are supported against the first support body via an inner edge support, and against the second support body via an outer edge support, and which control a passage of damping fluid in both directions by virtue of the fact that the valve spring discs lift-off either from the inner edge support or from the outer edge support, with elastic deflection. It is provided that the damping valve of the shock absorber has a stroke movable control body which is prestressed against the valve spring discs, with the result that the control behavior of the valve spring discs can be adjusted by means of the prestress of the control body. The further features and the advantages which can be achieved therewith and which are described above in conjunction with the damping valve are, of course, taken into account in the same way for the shock absorber according to the invention.

In particular, the damping valve can be arranged on a piston rod of the shock absorber, in order to run to and fro with the latter in the shock absorber tube. In this context, the damping valve performs the damping function of the shock absorber, wherein alternatively the damping valve can also be arranged in an attached module tube on the outside of the shock absorber tube of the shock absorber, and can have a flow of damping fluid passing through it.

Furthermore, the shock absorber can advantageously be embodied with an electric shift valve, wherein the damping valve according to the present invention is arranged in operative connection to the shift valve in the shock absorber.

Additional details of the present disclosure are further discussed below with reference to the attached drawing figures, which show an exemplary embodiment thereof.

FIG. 1 shows a cross-sectional view of an exemplary embodiment of a damping valve 1 for a shock absorber, and the damping valve 1 can be arranged, for example, at the end side on the piston rod of the shock absorber and be guided in the shock absorber tube. The damping valve 1 has a base body 10, 11, 12 which is formed from a cladding tube 10, a first support body 11 and a second support body 12. The support bodies 11 and 12 are fixedly arranged in the cladding tube 10, for example in that they are pressed, welded or preferably screwed into the cladding tube 10, by which means the prestress of the valve spring discs 13 and of the spring arrangement 19 can be changed if the support body 12 is screwed to different depths into the cladding tube 10. The cladding tube 10 and the support bodies 11 and 12 extend essentially rotationally symmetrically about the stroke axis 20, which at the same time forms the stroke axis for a piston rod, on the end side of which the damping valve 1 can be arranged.

A first damping fluid space 14 is separated from a second damping fluid space 15 by the damping valve 1. The first damping fluid space 14 is fluidically connected to the outside of the cladding tube 10 via an opening window 29 in the cladding tube 10, and the outside of the cladding tube 10 can form an annular gap between the shock absorber tube and the cladding tube 10, and this annular gap constitutes the first damping fluid space 14 which continues in the direction of the piston rod in the shock absorber. The second damping fluid space 15 constitutes the space in the shock absorber which faces away from the piston rod. In this context, the support bodies 11 and 12 are embodied in an annular shape and damping fluid can flow through the inside of said support bodies 11 and 12 in the second damping fluid space 15. In a way which is not shown in more detail, the cladding tube 10 is closed towards the top here and therefore embodied in the form of a pot.

A first circumferential supporting edge 21 is formed on the first support body 11, and a second circumferential supporting edge 22 is formed on the second support body 12. A packet of valve spring discs 13 is arranged between the supporting edges 21 and 22, said valve spring discs 13 forming, with slight elastic deflection against the supporting edge 21, a first, inner edge support 16, and with slight elastic deflection against the supporting edge 22 an outer, second edge support 17. In this context, the valve spring discs 13 can lift-off either from the inner edge support 16 or from the outer edge support 17, by elastic deflection.

According to the invention, the damping valve 1 also comprises a control body 18 which is arranged stroke movable, is prestressed against the valve spring discs 13, and with the prestress presses the valve spring discs 13 against the inner supporting edge 21 in a seal-forming fashion. The prestress is introduced into the control body 18 via a spring arrangement 19, and the spring arrangement 19 is composed, as are also the valve spring discs 13, from, for example, a plurality of spring discs 19 which form a packet. The spring discs 19 are held on the inside in the second support body 12 and centered therein by means of a centering seat 28. The control body 18 extends here into central openings in the spring discs 19 and is thereby guided centrally by means of the latter against the second support body 12 and can move in the stroke axis 20.

Furthermore, the valve spring discs 13 are held centered on the control body 18, and as a result of the prestress of the spring discs 19 in the centering seat 28 of the second support body 12 the latter prestresses the valve spring discs 13 centrally against the supporting edge 21 of the inner edge support 16. As a result, the opening behavior of the damping valve 1 can be adjusted in the traction stage in which the piston rod moves out of the shock absorber and in which the valve spring discs 13 lift-off from the inner edge support 16, in order to let damping fluid from the first damping fluid space 14 through into the second damping fluid space 15. If the spring discs 19 are more strongly prestressed or if they have a higher degree of rigidity, the damping effect in the traction stage is amplified and if the spring discs 19 are prestressed to a lesser degree or embodied in a softer fashion, the damping effect in the traction stage is attenuated.

In the pressure stage in which the base body 10, 11 and 12 is moved downwards in the direction of the second damping fluid space 15, the valve spring discs 13 lift-off from the outer supporting edge 22 on the second support body 12, with the result that the outer edge support 17 of the valve spring discs 13 becomes detached. As a result, damping fluid can pass from the second damping fluid space 15 into the first damping fluid space 14. Therefore, the damping effect for the pressure stage is determined exclusively by the prestress and the rigidity of the valve spring discs 13, since the latter do not lift-off from the inner edge support 16, and the control body 18 does not carry out a reciprocating movement in the stroke axis 20.

For example, the bottom valve spring disc 13 is embodied with a slot 23 through which an at least small through-flow of damping fluid through the slot 23 is possible, even when valve spring discs 13 are resting on the circumferential supporting edge 22, in order to provide a corresponding pressure stage start-up in the lower speed range.

Furthermore, a non-return valve 24 with a bypass function which permits, in the pressure stage, a through-flow of damping fluid from the second damping fluid space 15 into the first damping fluid space 14, is shown in the first support body 11. The damping fluid space 15 is divided here into a region above the control body 18 and into a region below the control body 18, and the control body 18 also has passage openings 30, with the result that the region surrounding the control body 18 in an annular shape also forms a partial region of the damping fluid space 15. The opening behavior of the valve spring discs 13 and the flow paths which result in the traction stage and the pressure stage of the damping valve 1 are described in more detail in the following FIGS. 2 and 3.

FIG. 2 shows a damping valve 1 in a traction stage in which the damping valve 1 is, for example, moved upwards at an end side on a piston rod of a shock absorber in the view shown, with the result that damping fluid flows from the first damping fluid space 14 into the second damping fluid space 15 as a result of a pressure difference. The damping fluid can flow into the first damping fluid space 14 through the opening windows 29 in the cladding tube 10, and build up a higher pressure in said damping fluid space 14 than the pressure of the damping fluid which is located in the damping fluid space 15. This results in an application of pressure to the valve spring discs 13 from the upper side, and the valve spring discs 13 lift-off with their inner edge support 16 from the control edge 21 on the first support body 11. The flow path of the damping fluid from the first damping fluid space 14 into the second damping fluid space 15 is shown by dashed lines, and the control body 18 has executed a reciprocating movement in the direction of the stroke axis 20, with the result that the valve spring discs 13 were able to lift-off from the supporting edge 21. The reciprocating movement of the control body 18 is carried out here with elastic deflection of the spring discs 19, which deflection is added to the elastic deflection of the valve spring discs 13 to form a total force which acts on the valve spring discs 13 as a force opposing the application of pressure. The opening behavior of the damping valve 1 in the traction stage shown can therefore be additionally influenced by the rigidity of the spring arrangement 19.

Furthermore, a non-return valve 25 with a bypass function is shown in an opened position, by means of which non-return valve 25 a small quantity of damping fluid passes from the first damping fluid space 14 into the second damping fluid space 15 and is therefore opposed to the passage direction of the non-return valve 24 which has already been described in conjunction with FIG. 1.

FIG. 3 shows the damping valve 1 in the pressure stage in which the latter is, for example, moved downwards on the end side on a piston rod of a shock absorber along the stroke axis 20. As a result, the pressure of the damping fluid in the second damping fluid space 15 is higher than in the first damping fluid space 14, and a flow path is produced from the damping fluid space 15 into the damping fluid space 14 according to the dashed lines. The flow path opens in that the damping fluid from the second damping fluid space 15 presses from below against the valve spring discs 13, with the result that the latter lift-off, with elastic deflection, from the supporting edge 22 on the second support body 12 and therefore release the outer edge support 17. In the process, the control body 18 remains unmoved along the stroke axis 20, and the valve spring discs 13 maintain their seat counter to the inner edge support 16.

The non-return valve 24 for performing a bypass function in an opened state is also shown, damping fluid flowing through the non-return valve 24 from the second damping fluid space 15 into the first damping fluid space 14. The non-return valve 25 remains closed here.

FIG. 4 shows a diagram with a damping force F plotted against a movement speed v, wherein the upper profile I in the positive force range represents the force profile of the traction stage as the piston rod moves out of the shock absorber, and in the lower, negative force range the profile II represents the pressure stage which describes retraction of the piston rod into the shock absorber.

It is apparent here that the profile of the traction stage (FIG. 2) differs from the profile of the pressure stage (FIG. 3), and forces of different magnitude occur for the pressure stage and the traction stage, said forces being achieved in that the damping behavior of the damping valve 1 for the traction stage turns out differently from that in the pressure stage, since in the traction stage the valve spring discs 19 have to be activated in addition to the valve spring discs 13. In the pressure stage (FIG. 3), only elastic deformation of the valve spring discs 13 is necessary.

A profile III which represents the force if one of the non-return valves 24 and/or 25 is present is also shown, as a result of which further individual traction stage profiles and pressure stage profiles can be set by means of the bypass function which is formed.

Finally, FIG. 5 shows a detail of a shock absorber 100 with a shock absorber tube 31 in which the damping valve 1 is guided on the end side on a piston rod 26 and is sealed with a sealing tape 35 against the inner wall of the shock absorber tube 31. A shock absorber 100 with a damping valve 1 according to the invention is therefore shown, wherein said damping valve 1 is attached at the end side to the piston rod 26 by means of a holding tappet 32 and a securing nut 33.

Finally, FIG. 6 shows a further exemplary embodiment of a shock absorber 100 with a damping valve 1, which, in a manner which is not shown in more detail, is also guided on the end side on a piston rod in a shock absorber tube 31 of a shock absorber 100. The damping valve 1 is operatively connected to a shift valve 27 which is also arranged on the end side on the piston rod and forms a further valve arrangement 34 for influencing the force profile in the traction stage and/or in the pressure stage, wherein the shift valve 27 can be activated electrically. In this context, the exemplary embodiment shows that the cladding tube 10 is sealed as a component of the base body of the damping valve 1 against the inside of the shock absorber tube 31 by means of a sealing tape 35. In this context, the first damping fluid space 14 is formed between the cladding tube 10 and the shock absorber tube 31, and the second damping fluid space 15 is formed underneath the damping valve 1 and is sealed against the first damping fluid space 14 by means of the sealing tape 35.

The invention is not restricted in its embodiment to the preferred exemplary embodiments specified above. Instead, a number of variants are conceivable which make use of the illustrated solution even in the case of embodiments which are of a fundamentally different type. All of the features and/or advantages, including structural details or spatial arrangements, which can be found in the claims, the description or the drawings may be essential to the invention either per se or in a wide variety of combinations.

LIST OF REFERENCE SYMBOLS

100 shock absorber
1 damping valve
10 base body, cladding tube
11 base body, first support body
12 base body, second support body
13 valve spring disc
14 first damping fluid space
15 second damping fluid space
16 inner edge support
17 outer edge support
18 control body
19 spring arrangement, spring discs 20 stroke axis
21 supporting edge on the first support body
22 supporting edge on the second support body
23 slot
24 non-return valve
25 non-return valve
26 piston rod
27 shift valve
28 centering seat
29 opening window
30 passage opening
31 shock absorber tube
32 holding tappet
33 securing nut
34 valve arrangement
35 sealing tape
F damping force
v speed of movement of the piston around the shock absorber tube
I force profile in the traction stage
II force profile in the pressure stage
III force profile with additional bypass

The invention claimed is:

1. A damping valve for a shock absorber, comprising:
a base body having a first support body including an inner edge support, a second support body including an outer edge support, and defining an internal space within said base body, a position of said second support body being adjustable in a stroke axial direction of the shock absorber relative to said first support body;
at least one valve spring disc disposed within said internal space of said base body, a first side of said valve spring disc being supported at an inner radial side thereof against said inner edge support of said first support body, and a second opposing side of said valve spring disc being supported at an outer radial side thereof against said outer edge support of said second support body, wherein said first and second support bodies are positionable so as to cause a relative elastic deflection between said outer radial side and said inner radial side of said at least one spring valve, and thereby generate a pre-stress in said at least one valve spring disc, and wherein an adjustment in the relative axial position between said first and second support bodies can adjust both the amount of relative elastic deflection and pre-stress in said at least one valve spring disc, said at least one valve spring disc being configured to,
separate a first damping fluid space from a second damping fluid space within said internal space of said base body, and
control a passage of damping fluid in opposing directions past said at least one valve spring disc between said first and second damping fluid spaces, by an elastic deflection of said at least one valve spring disc; and
a stroke moveable control body operatively biased by an adjustable biasing force against, and axially moveable with, the second side of said at least one valve spring disc,
wherein when the damping fluid is forced from said first damping fluid space to said second damping fluid space, said inner radial side of said valve spring disc lifts off of said inner edge support of said first support body to permit damping fluid to flow there between, and a control behavior of said at least one valve spring disc is adjustable by adjusting at least one of the amount of pre-stress in the at least one valve spring disc by a change in the position of the first support body relative to the second support body and the amount of biasing force applied to said stroke moveable control body that is biased against said at least one valve spring disc,
wherein when the damping fluid is forced from said second damping fluid space to said first damping fluid space, said outer radial side of said valve spring disc lifts off of said outer edge support of said second support body to permit damping fluid to flow there between, and a control behavior of said at least one valve spring disc is adjustable by adjusting the position of the first support body relative to the second support body and thus the amount of pre-stress in the at least one valve spring disc.

2. The damping valve of claim 1, wherein said control body is disposed within and held against said base body by a spring arrangement.

3. The damping valve of claim 2, wherein said spring arrangement is formed by one or more spring discs configured to center said control body within said base body and permit said control body to be stroke moveable in a direction of a stroke axis.

4. The damping valve of claim 2, further comprising at least one one-way bypass valve disposed in said base body that is configured to permit an additional stream of damping fluid to flow there through when said bypass valve is in an open state.

5. The damping valve of claim 1, wherein said at least one valve spring disc is held centered on said control body.

6. The damping valve of claim 1, wherein said base body further has a cladding tube within which are disposed said first and second support bodies.

7. The damping valve of claim 1, wherein at least one of said at least one valve spring disc includes a slot defined therein in a region of at least one of said inner or outer edge supports, said slot forming a bypass configured to permit damping fluid to flow there through.

8. The damping valve of claim 1, wherein when the damping valve is under extension loading, the inner side of the at least one valve spring disc lifts off from the inner edge support to permit passage of the damping fluid in a first direction, wherein when the damping valve is under compression loading the outer side of the at least one valve spring disc lifts off from the outer edge support to permit passage of the damping fluid in a second direction.

9. The damping valve of claim 1 wherein the at least one valve spring disc is configured to elastically deform such that the inner side can lift off from the inner edge support to permit passage of the damping fluid in a first direction, wherein the at least one valve spring disc is configured to elastically deform such that the outer side can lift off from the outer edge support to permit passage of the damping fluid in a second direction.

10. A shock absorber, comprising:
a shock absorber tube;
a damping valve disposed within said shock absorber tube, said damping valve having,
a base body having a first support body including an inner edge support, a second support body including an outer edge support, and defining an internal space within said base body, a position of said second support body being adjustable in a stroke axial direction of the shock absorber relative to said first support body,
at least one valve spring disc disposed within said internal space of said base body, a first side of said valve spring disc being supported at an inner radial side thereof against said inner edge support of said first support body, and a second opposing side of said valve spring disc being supported at an outer radial side thereof against said outer edge support of said second support body, wherein said first and second support bodies are positionable so as to cause a relative elastic deflection between said outer radial side and said inner radial side of said at least one spring valve, and thereby generate a pre-stress in said at least one valve spring disc, and wherein an adjustment in the relative axial position between said first and second support bodies can adjust both the amount of relative elastic deflection and pre-stress in said at least one valve spring disc, said at least one valve spring disc being configured to,
separate a first damping fluid space from a second damping fluid space within said internal space of said base body, and
control a passage of damping fluid in opposing directions past said at least one valve spring disc between said first and second damping fluid spaces, by an elastic deflection of said at least one valve spring disc, and
a stroke moveable control body operatively biased by an adjustable biasing force against, and axially moveable with, the second side of said at least one valve spring disc,
wherein when the damping fluid is forced from said first damping fluid space to said second damping fluid space, said inner radial side of said valve spring disc lifts off of said inner edge support of said first support body to permit damping fluid to flow there between, and a control behavior of said at least one valve spring disc is adjustable by adjusting at least one of the amount of pre-stress in the at least one valve spring disc by a change in the position of the first support body relative to the second support body and the amount of biasing force applied to said stroke moveable body that is biased against said at least one valve spring disc,
wherein when the damping fluid is forced from said second damping fluid space to said first damping fluid space, said outer radial side of said valve spring disc lifts off of said outer edge support of said second support body to permit damping fluid to flow there between, and the control behavior of said at least one valve spring disc is adjustable by adjusting the position of the first support body relative to the second support body and thus the amount of pre-stress in the at least one valve spring disc.

11. The shock absorber of claim 10, further comprising a piston rod at least partially disposed within said shock absorber, to an end of which piston is coupled said damping valve.

12. The shock absorber of claim 10, further comprising an electric shift valve operatively connected to said damping valve within said shock absorber tube.

13. The shock absorber of claim 10, wherein when the damping valve is under extension loading, the inner side of the at least one valve spring disc lifts off from the inner edge support to permit passage of the damping fluid in a first direction, wherein when the damping valve is under compression loading the outer side of the at least one valve spring disc lifts off from the outer edge support to permit passage of the damping fluid in a second direction.

14. The shock absorber of claim 10 wherein the at least one valve spring disc is configured to elastically deform such that the inner side can lift off from the inner edge support to permit passage of the damping fluid in a first direction, wherein the at least one valve spring disc is configured to elastically deform such that the outer side can lift off from the outer edge support to permit passage of the damping fluid in a second direction.

* * * * *